United States Patent [19]

Bauer

[11] Patent Number: 5,052,434
[45] Date of Patent: Oct. 1, 1991

[54] VALVE, ESPECIALLY FOR COMPRESSORS

[75] Inventor: Friedrich Bauer, Vienna, Austria

[73] Assignee: Hoerbiger Ventilwerke Aktiengesellschaft, Vienna, Austria

[21] Appl. No.: 587,083

[22] Filed: Sep. 24, 1990

[30] Foreign Application Priority Data

Sep. 27, 1989 [AT] Austria .................. 2249/89

[51] Int. Cl.$^5$ .............................. F16K 15/08
[52] U.S. Cl. ................ 137/516.13; 137/512.1; 137/516.15; 137/516.25; 251/212
[58] Field of Search ........... 137/512.1, 512.4, 516.11, 137/516.13, 516.15, 516.17, 516.19, 516.21, 516.23, 516.25, 516.27; 251/212, 356

[56] References Cited

U.S. PATENT DOCUMENTS

| 767,118 | 8/1904 | Popham et al. | 137/516.23 X |
| 919,036 | 4/1909 | Langer | 137/512.1 |
| 2,255,404 | 9/1941 | White et al. | 137/516.25 |
| 2,956,582 | 10/1960 | Pranter | 137/512.1 |
| 3,378,029 | 4/1968 | Lee | 137/512.1 |
| 3,831,627 | 8/1974 | Hanlon | 251/212 X |
| 3,898,999 | 8/1975 | Haller | 137/512.1 |
| 4,483,363 | 11/1984 | Madoche et al. | 137/516.15 X |

FOREIGN PATENT DOCUMENTS

| 202607 | 10/1908 | Fed. Rep. of Germany . |
| 202609 | 10/1908 | Fed. Rep. of Germany . |
| 2446977 | 4/1976 | Fed. Rep. of Germany . |
| 2071818 | 9/1981 | United Kingdom . |

Primary Examiner—John Rivell
Attorney, Agent, or Firm—Watson, Cole, Grindle & Watson

[57] ABSTRACT

The valve, which is intended especially for compressors, comprises a valve seat (1) with passage channels (2), a catcher (3), and at least one sealing element (5), which is arranged in the intermediate space between the valve seat (1) and the catcher (3). The passage channels (2) of the valve seat (1) are controlled by sealing rings (10), which project into their assigned passage channel (2) with one part of their profile when the valve is closed. The sealing surfaces (13), against which the sealing rings (10) abut when the valve is closed, extend at oblique angles to the direction of the lifting movement of the sealing rings (10). To ensure that the valve is sealed even when the sealing rings (10) in their dimensions do not fit accurately with respect to the valve seat (1) and to its sealing surfaces (13), e.g., owing to manufacturing tolerances or different thermal expansions, each sealing ring (10) is subdivided into at least two subrings (11, 12), which are tightly joined together and can be moved head-on in the lifting direction.

17 Claims, 2 Drawing Sheets

VALVE, ESPECIALLY FOR COMPRESSORS

BACKGROUND OF THE INVENTION

The invention relates to a valve, in particular for compressors, comprising a valve seat, which has at least one annular passage channel for the controlled medium, a catcher, which is arranged at a distance above the valve seat, and at least one sealing element, which can be moved between the valve seat and the catcher in order to carry out the lifting movement and controls one or several passage channels each of the valve seat, where each passage is assigned a sealing ring, which projects into the passage channel with one part of its profile when the valve is closed and abuts the sealing surfaces, which extend into the valve seat and/or the sealing rings at oblique angles to the direction of the lifting movement of the sealing rings.

Sealing valves of this design have been known for a long time. DE-PS 202 609 of 1908 describes and presents (FIG. 6) a valve, whose sealing surfaces extend conically into the valve seat and are sealed by the conical valve rings, which project partially into the passage channels. Later trough-shaped or bowl-shaped hollow bodies made of metal were used as the sealing elements of valves. DE-OS 24 46 977 discloses ring valves, whose sealing rings are designed toroidally with a circular cross section or with another flow-optimum, rounded profile, e.g. tear-shaped. Finally a valve with sealing rings that abut with a circular cross sectional profile against the tilted sealing surfaces of the valve seat is disclosed in U.S. Pat. No. 3,536,094.

These valves all have the drawback that they are actually sealed when their sealing elements fit accurately on the sealing surfaces of the passage channels of the valve seat that they control. If the valve parts are fabricated inaccurately or change their dimensions during service, e.g., through differential thermal expansion of the valve seat and the sealing rings, through swelling of valve rings made of non-metallic material during the absorption of liquid or through other affects of the medium, then the valve no longer seals completely.

If a sealing ring, for example due to thermal expansion, exhibits a somewhat greater mean diameter than the associated passage channel, it abuts only with its outer rim against the outer sealing surface of the passage channel, whereas a gap remains between the inner sealing surface and the sealing ring. There are similar drawbacks when the sealing rings, even if they are made of metal, become distorted when the valve is operating due to thermal or mechanical stresses or when the valve pieces themselves are manufactured inaccurately. The resulting leaks result not only in leak losses with a resulting decrease in the efficiency of the compressor but also they cause additional noises and thermal stresses. With sealing rings made of plastic the absorption of moisture can result in significant changes in dimensions, resulting in the same drawbacks.

An attempt to enable a tight abutting between the sealing rings and the sealing surfaces of the valve seat that are assigned to them with differential thermal expansion is known from GB-PS 2 071 818. This is to be achieved in that the sealing rings designed with a rounded off contoured profile are designed flexible and the spring force is transferred to the sealing rings, inserting spacers with rounded off surface. The rounded off spacers are to bring about that the sealing rings are bent and twisted so that they abut sealingly against the sealing surfaces of the valve seat despite the deviating shape. Apart from the fact that in this design for the sealing rings materials have to be used that are adequately flexible and, therefore, can be stressed only slightly or moderately mechanically, in most cases it is not possible to bend and twist the sealing rings to an adequate degree, for which reason leaks cannot be reliably avoided. In addition, the additionally mandatory spacers between the sealing rings and the associated springs lead to a disadvantageous increase in the cost of production, increase in mass of the moved valve parts during service and to a higher space requirement.

The object of the present invention is to avoid the cited drawbacks of the known designs and to provide a simple design to reliably prevent leaks caused by dimensional differences between the sealing rings and the associated sealing surfaces of the valve seat.

SUMMARY OF THE INVENTION

This problem for the valve described in the introductory part is solved with the invention in that each sealing ring is subdivided into at least two subrings, which are tightly joined together and can be moved head-on in the lifting direction. The subrings can be moved independently of each other in the lifting direction, thus guaranteeing in a surprisingly simple manner that even with greater variations in dimensions they always abut tightly against their assigned sealing surface of the valve seat. The final position of the respective sealing area of the sealing ring is to a specific extent independent of the final position of the other sealing area of the same sealing ring without the sealing ring having to bend or twist. Therefore, the design of the invention guarantees that the valve will always be reliably sealed.

The valve according to the invention can have other designs. The simplest embodiment consists of the subrings abutting each other concentrically along the cylindrical joint faces. Thus, the sealing rings used according to the invention differ from the conventional sealing rings only in that they are divided into subrings at an arbitrary point of their cross section or also at two or more points by means of a cut extending parallel to the lifting direction of the valve. The subrings join and can be displaced head-on in the lifting direction, thus providing for a reliable seal under all environmental errors and also with variations in dimensions during fabrication.

The seal between the joint faces of two adjacent subrings offers in general no difficulties. If the sealing element is stressed by the medium pressure, the adjacent subrings are firmly connected to one another subject to the influence of the compressive force exerted by the medium in the region of its ends facing the catcher and, thus, provide for a tight seal. However, the seal can be further improved by providing at least one of the joint faces with an annular groove into which a sealing ring, e.g., an O-ring or a groove ring is inserted. If the sealing ring is installed under elastic prestress, it also prevents both subrings from sliding apart in the axial direction.

The joint faces between the subrings can also be stepped so as to fit in one another, where in addition at least one sealing ring can be inserted between the intermeshing steppings. A reliable seal can also be achieved between the adjacent subrings if only the joint faces intermesh without having to insert a seal. Preferably a graduation is formed that provides space for a sealing ring, which is compressed by the pressure medium, when the two subrings of the sealing ring abut the sealing surfaces of the valve seat. This sealing ring can also exert a spring action and, thus, contribute to the further improvement of the seal and also to damping the impact of the sealing element on the valve seat.

Another embodiment of the valve of the invention consists of at least one joint face being provided with at least one sealing liup, which abuts against an adjacent joint face. In this design the region of the joint faces between two adjacent subrings has concentric sealing lips that provide for a reliable seal. Preferably there are between the subrings at least two sealing lips that project in the opposite directions. The two sealing lips seal the joint faces in both directions so that the sealing ring is also placed on the valve seat in the turned spacial position and, in operation, can be used as the sealing element.

According to one variant of the invention, the joint faces of adjacent subrings can be covered by a flexible lug, which starts from one subring and projects diagonally over the other subring. Preferably this flexible lug is provided on the side of the catcher so that it is forced against the subring to be sealed by means of the medium pressure when the valve is closed. However, such flexible lugs can also be used to advantage not only on both sides of the sealing ring but also on the catcher side and also on the side of the seat in order to achieve a seal in both directions.

In another embodiment of the invention, the joint faces of the adjacent subrings can be covered by a bridge on the catcher side. This bridge can be designed as a flat ring, which is connected at least on its rims to each subring, e.g., by means of vulcanizing or cementing. One design of this variant provides that the bridge project with a cylindrical rib, extending in the direction of the lifting movement, in the region of the joint faces between two subrings. This bridge and the cylindrical rib that is provided in any event serve to reinforce the sealing ring and also bring about a reliable seal of the joint face between the adjacent subrings, in particular, when the edges of the bridge are connected to the subrings by means of vulcanization or cementing.

Another possibility to design the subrings within the scope of the invention advantageously and to adjoin into one common sealing ring consists of connecting the subrings via at least one flexible rib. In this case the sealing rings can be made of the same material as one piece; however, separately manufactured ribs can als be used that then connect the subrings. The ribs can extend in the lifting direction; however, they can also extend at right angles to the lifting direction and be formed by recesses, which start from one or both sides of the sealing ring. In all cases, the regions of the sealing ring that abut against the sealing surfaces of the valve seat can be displaced elastically head-on, so that they form intrinsic subrings or at least subring regions, which seal their assigned sealing surface independently of each other.

The subrings, which form together the sealing ring, can also be designed with unequally large profiles or cross sections. Thus, in accordance with the invention a subring can exhibit on its side facing the valve seat, on its inner rim and/or outer rim at least one graded recess into which another subring with a smaller cross sectional profile is inserted. If a gap or a groove is provided in the lifting direction between the subring with the smaller cross sectional profile and the boundary of the recess, a sealing ring can be inserted into the gap or into the groove. Even this design makes it possible for both rims of the sealing ring to abut firmly against the associated sealing surfaces of the valve seat, even when the temperature fluctuates, manufacturing tolerances are high or the valve parts are deformed in some other manner. In addition, in this design the subrings with larger profile, which bear the subrings with a smaller profile, can be combined into a sealing plate extending over several concentric passage channels of the valve seat. In this case the subrings that are provided at each sealing ring exhibit a smaller cross sectional profile and can be moved against the subring with a larger cross sectional profile, also largely compensate for existing differences in dimensions.

With the valve of the invention the sealing rings, each of which comprises two or more subrings, are guided separately from one another in the valve and are loaded separately by means of springs. In the case of valves having several concentric passage channels, the sealing rings assigned to the individual channels are covered by a common guide or support plate, which transfers the spring force to the individual sealing rings and also serves simultaneously as the guide during the lifting movement. However, it is also possible within the scope of the invention to join several sealing rings, which have subrings, into one common sealing element, where the sealing rings are connected with preferably flexible connecting ribs via radial ribs or via a common guide plate. In all cases the sealing rings subdivided into subrings ensure that the subrings moveable in opposite directions when the valve is closed rest firmly on the sealing surfaces and, thus, provide that the valve is totally sealed. If a sealing element firmly interlocking several sealing rings is use, each sealing ring can be provided with a subring, which then takes over the reliable sealing, both at its inner rim and also on its outer rim. However, it is also possible to connect the individual sealing rings with flexible ribs, thus guaranteeing a reliable seal over the entire surface of the valve without using two subrings per sealing ring.

BRIEF DESCRIPTIONS OF THE DRAWINGS

Other features and advantages of the invention follow from the following description of the embodiments, which are shown in the drawings. In these drawings FIGS. 1 and 2 are axial cross sectional views of the valve of the invention and FIGS. 3 to 17 are cross sectional views of different embodiments of the sealing rings for these valves.

DETAILED DESCRIPTION OF THE PREFERRED EMBODIMENTS

Figure 1:
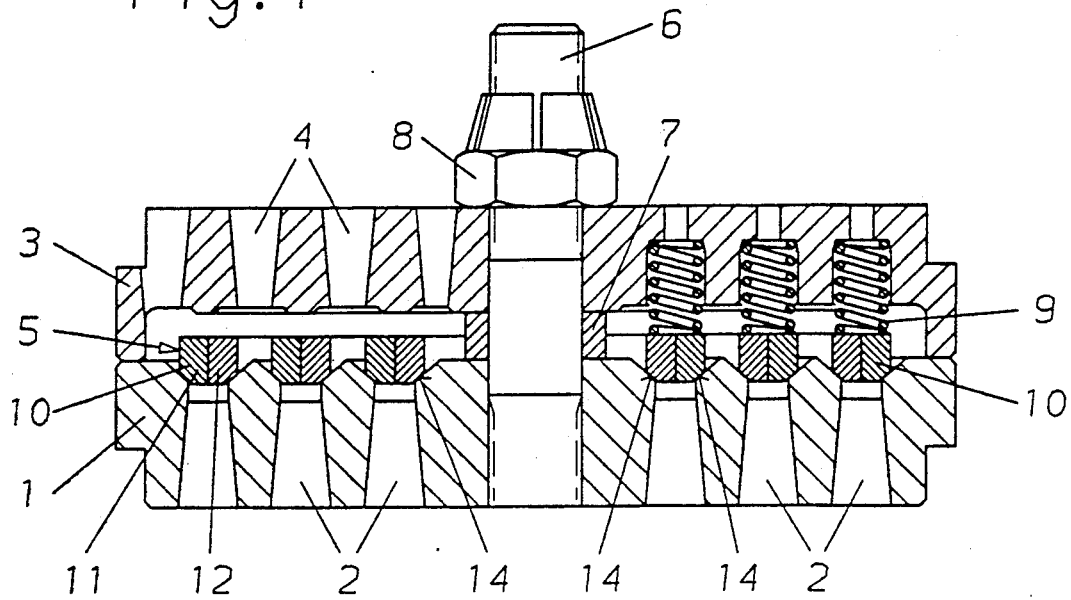
Figure 2:
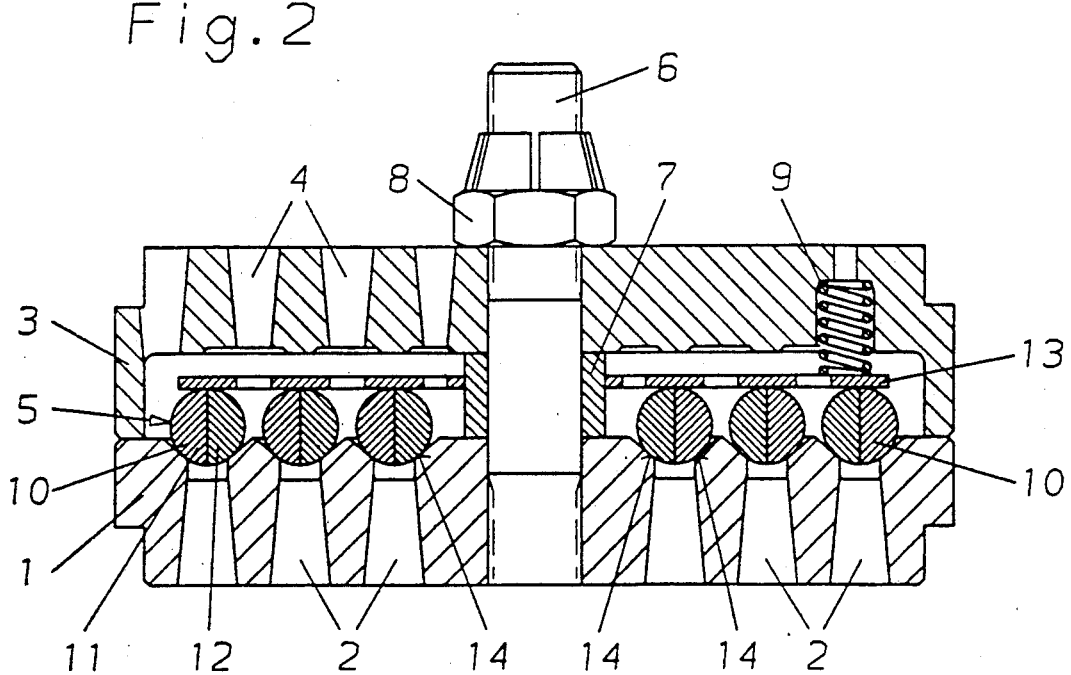

The valves of FIGS. 1 and 2 comprise a valve seat 1, which has annular passage channels 2, comprising a catcher 3 arranged at a distance above valve seat 1, with discharge channels 4 and comprising sealing elements 5 to control passage channels 2 in valve seat 1. The valve parts are held together by means of a central screw 6, which clamps valve seat 1, a spacing ring 7 and catcher 3 by means of nut 8. Sealing elements 5 are loaded in the direction of valve seat 1 by locking springs 9, which are designed as helical springs and are housed in the sets of springs 9 of catcher 3.

In the embodiment of FIG. 1 the sealing elements 5 comprise three individual sealing rings 10. Each sealing ring 10 is subdivided into two subrings 11 and 12, which can be firmly connected to one another and can be moved head-on in the lifting direction. Locking springs 9 act directly on the individual sealing rings 10. The valve of FIG. 2 also has three separate sealing rings 10, which comprise subrings 11 and 12. At variance with the design according to FIG. 1, a common guide plate 13, which in turn is loaded by locking springs 9 and transfers the spring force to the sealing rings 10, rests on sealing rings 10. In this design only locking springs that rest on a ring diameter are mandatory in order to achieve, nevertheless, a largely uniform spring load of all sealing rings 10.

Guide plate 13 is connected to sealing ringgs 10 by means of frictional force and, thus, forms, together with sealing rings the sealing element 5 of the valve. During the lifting movement, the guide plate exerts a guiding function on sealing rings 10, a feature that means an additional advantage to the aforementioned comparability of the spring load and the economizing of locking springs. Guide plate 13 can also have flexible guide rods, which are clamped into the valve and serve to further improve the guiding. Flexible ribs can also be provided between the individual sealing rings 10.

It is apparent from both embodiments that, when the valve is closed, sealing rings 10 project with one segment of their profile into their assigned passage channel 2 of valve seat 1 and rest there on sealing surfaces 14 extending at oblique angles to the flow direction or the direction of the lifting movement of valve rings 10. Thus, these frustoconical, annular sealing surfaces 14 are recessed in valve seat 1. In this manner they ensure that during their lifting movements sealing rings 10 retain the correct position in the valve, thus do not leave the region of the passage channel 2 assigned to them. According to FIG. 1, the sealing rings have a rectangular cross section, which is adapted to the sealing surfaces in the region of the titled sealing surfaces 14, whereas in the embodiment of FIG. 2 the torodial sealing rings 10 are provided with a circular cross section.

Figure 3:
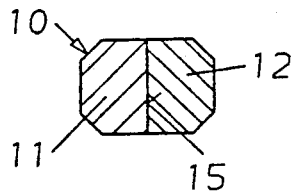
Figure 4:
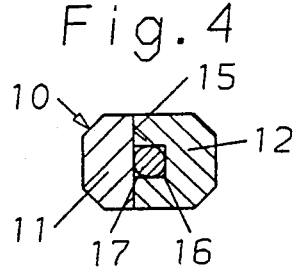
Figure 5:
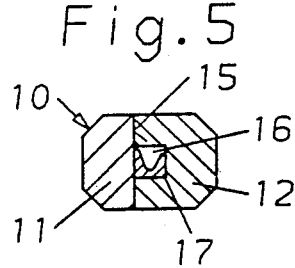
Figure 6:
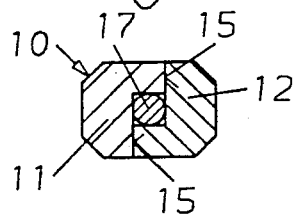

Within the scope of the invention various embodiments of sealing rings 10 are possible, in particular with respect to the ring cross section and the course of the joint faces between both subrings 11 and 12. The embodiment of FIG. 3 shows a sealing ring 10 with a rectangular, approximately square cross section, whose two subrings 11 and 12 abut along cylindrical joint faces 15. The design according to FIG. 4 deviates from that of FIG. 3 only in that joint face 15 has a ring groove 16 in which a sealing ring 17 lies. Sealing ring 17 is designed here as an O-ring. FIG. 5 shows and embodiment in which sealing ring 17 is designed as a groove ring. According to FIG. 6, both joint faces 15 of both subrings 11, 12 are stepped, the sealing ring 17 being inserted between the two steps.

Figure 7:
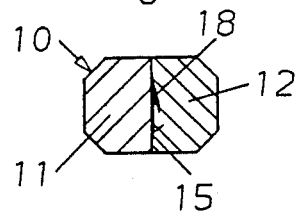
Figure 8:
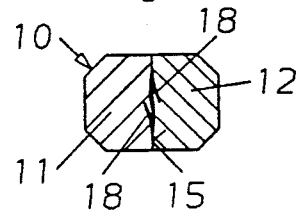
Figure 9:
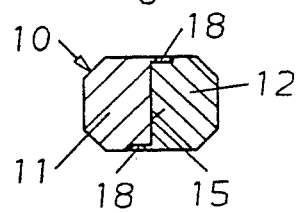

FIG. 7 and 8 show variants in which sealing lips 18 are provided to seal between the two abutting joint faces 15 of both ring parts 11 and 12. According to FIG. 7, only one joint face 15 is provided with a sealing lip 18, which abuts firmly against the other joint face 15 and, thus, ensures that when both subrings 11 and 12 are moved reciprocally, the joint faces 15 are reliably sealed. According to FIG. 8, there are two sealing lips 18, which extend in opposite directions, a feature that has the advantage that the seal is effective along joint faces 15 in both passaage directions. Accordiing to FIG. 9, each subring 11, 12 is provided with a flexible lug 18, which starts from a subring 11, 12 respectively and projects diagonally over the other subring 11, 12, covering the joint faces 15 on their outside and, thus, providing for the seal.

Figure 10:
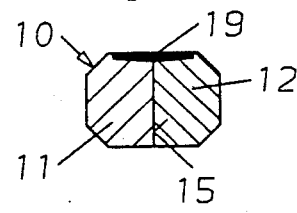
Figure 11:
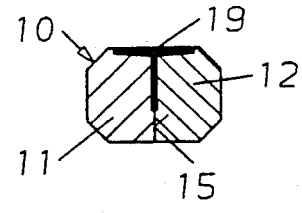

According to FIGS. 10 and 11, joint faces 15 between the two subrings 11 and 12 are covered by a bridge 19 extending at right angles. Each end of the bridge 19 designed as a flat ring can be connected to a subring 11, 12, e.g., by means of vulcanizing or cementing. In the emobodiment of FIG. 11, bridge 19 is also provided with a cylindrical rib 20 that extends in the direction of the lifting movement and projects in the region of the joint faces 15 between both subrings 11 and 12 and, thus, reinforces the entire sealing ring 10.

Figure 12:
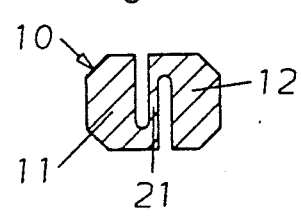
Figure 13:
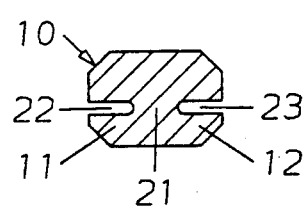
Figure 14:
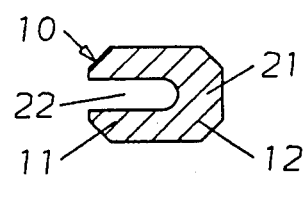
Figure 15:
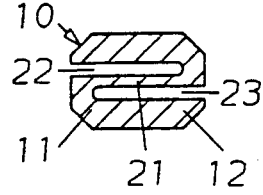

Sealing rings 10 can also be designed as one piece and still fulfill the proposed functional requirements. Fig. 12 shows an embodiment in which the two subrings 11 and 12 are connected by means of a flexible rib 21. In this manner, too, subrings 11 and 12 or the subring regions, which abut against sealing surfaces 14 of valve seat 1, can move head-on in the lifting direction so that they can compensate for possible manufacturing tolerances or differences in the dimensions owing to different thermal expansions. The same also applies to the design of sealing ring 10 according to FIG. 13, where rib 21 also extends in the lifting direction. The bottom part of sealing ring 10 is partially severed by means of cross slots 22 and 23, resulting in flexible subrings 11 and 12. Even in the embodiments of FIGS. 14 and 15, the mandatory flexibility of the ring parts denoted as subrings 11 and 12 is achieved with respect to one another through lateral recesses such as cross slots 22 and 23. These embodiments are especially suitable if sealing rings 10 are made of plastic or similar elastic material.

Figure 16:
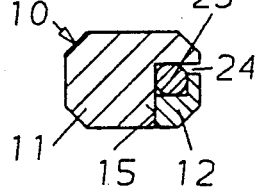

Sealing ring 10 can also be subdivided into subrings 11 and 12 whose cross sectional profile varies in size. FIG. 16 shows such an embodiment in which subring 11 is designed with a large cross sectional profile and has a stepped recess 24, into which the subring 12 designed with a smaller cross sectional profile is inserted, only on its inner rim, which faces the valve seat following installation into a valve. In this embodiment joint faces 15 also extend between both subrings 11, 12 in the lifting direction. A sealing ring 25, which not only brings about a seal between both joint faces 15 but simultaneously also exerts a springy effect on subring 12 in the direction of the valve seat, is inserted between the upper side of subring 12 and the boundary of recess 24.

Figure 17:
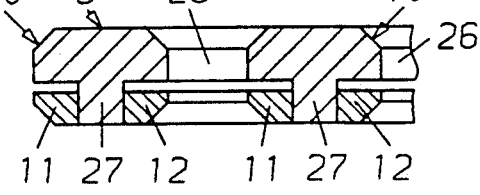

Finally FIG. 17 shows an embodiment in which two concentric sealing rings 10, each of which comprises subrings 11 and 12, are connected to form a common sealing element 5. Both sealing rings 10 are connected by means of radial ribs 26 that extend between said sealing rings and are merely indicated in FIG. 17. Each sealing ring 10 is provided both in its inner rim and on its outer rim with subrings 11, 12, which are guided at downwardly projecting guide ribs 27. Even in this embodiment it is ensured that the subrings 11, 12 abutting against inclined sealing surfaces 13 of valve seat 1 can be moved independently of one another so that dimensional differences can be compensated for and a total seal can always be obtained.

What is claimed is:

1. A valve apparatus which can control the flow of a controlled medium therethrough and which comprises:
    a catcher,
    a valve seat which defines a discharge side that faces said catcher and an annular passage through which controlled medium can flow in a direction of flow, said annular passage defining a frustoconical seating surface which faces said catcher, and a first sealing element which includes a first sealing ring that is movably positioned between said catcher and said valve seat and can move in a lifting direction parallel to said direction of flow and into said annular passage to abut said sealing surface and close said annular passage, said first sealing ring comprising two subrings which are tightly joined together and can be moved in said lifting direction.

2. A valve apparatus as claimed in claim 1, wherein said two subrings comprise an outer ring which defines an inner cylindrical joint face and an inner ring which defines an outer cylindrical joint face, said two subrings being concentrically positioned such that said inner and outer cylindrical joint faces abut one another.

3. A valve apparatus as claimed in claim 2, wherein one of said inner and outer cylindrical joint faces includes a ring groove that contains a second sealing element.

4. A valve apparatus as claimed in claim 2, wherein the joint faces are stepped so as to fit in one another, and wherein a second sealing ring is positioned between the intermeshing steppings.

5. A valve apparatus as claimed in claim 2, wherein at least one of said inner and outer joint faces is provided with at least one sealing lip which abuts against the other of said joint faces.

6. A valve apparatus as claimed in claim 2, wherein two sealing lips are located between said two subrings, said sealing lips projecting in opposite directions.

7. A valve apparatus as claimed in claim 2, wherein the joint faces of said inner and outer subrings are covered by a flexible lug which extends from one subring and projects diagonally over the other subring.

8. A valve apparatus as claimed in claim 2, wherein the joint faces of said two subrings are covered by a bridge on a side thereof facing the catcher.

9. A valve apparatus as claimed in claim 8, wherein the bridge is designed as a flat ring which is connected at least on its rims to each subring.

10. A valve apparatus as claimed in claim 8, wherein the bridge projects with a cylindrical rib extending in the direction of the lifting movement, in the region of the joint faces between said two subrings.

11. A valve apparatus as claimed in claim 1, wherein the two subrings are connected by means of at least one flexible rib.

12. A valve apparatus as claimed in claim 11, wherein the ribs extend in the lifting direction.

13. A valve apparatus as claimed in claim 11, wherein the ribs extend at right angles to the lifting direction and are formed by recesses which start from one or both sides of the sealing ring.

14. A valve apparatus as claimed in claim 1, wherein one of said subrings has on a side thereof facing the valve seat on one of an inner rim and outer rim therof on a side thereof facing the valve seat at least one graded recess into which the other subring, which has a smaller cross sectional profile, is inserted.

15. A valve apparatus as claimed in claim 14, wherein a gap into which a second sealing ring can be inserted is provided in the lifting direction between the subring with the smaller cross sectional profile and the boundary of the recess.

16. A valve apparatus as claimed in claim 1, wherein said first sealing element comprises several sealing rings formed of subrings which are connected together by one of flexible connecting ribs, radial ribs, and a common guide plate.

17. A valve apparatus as claimed in claim 1, wherein said valve seat includes a plurality of annular passages through which controlled medium can flow in said direction of flow, each of said annular passages defining a frustoconical seating surface which faces said catcher, and wherein said first sealing element includes a plurality of first sealing rings which can be respectively moved into said annular passages, each said first sealing rings comprising two subrings which are tightly joined together and can be moved in said lifting direction.

* * * * *